(12) United States Patent
Kare et al.

(10) Patent No.: US 11,856,014 B2
(45) Date of Patent: Dec. 26, 2023

(54) ANOMALY DETECTION IN COMPUTING COMPUTING SYSTEM EVENTS

(71) Applicant: Capital One Services, LLC, McLean, VA (US)

(72) Inventors: Sarvani Kare, McLean, VA (US); Vannia Gonzalez Macias, McLean, VA (US); Farshid Marbouti, McLean, VA (US); Stephen Fletcher, McLean, VA (US); Boshika Tara, McLean, VA (US); Patrick Sofo, McLean, VA (US); Urvish Patel, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 80 days.

(21) Appl. No.: 17/239,143

(22) Filed: Apr. 23, 2021

(65) Prior Publication Data
US 2022/0345473 A1    Oct. 27, 2022

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC . H04L 63/1425; H04L 63/1416; H04L 63/00; H04L 63/14
See application file for complete search history.

(56) References Cited

U.S. PATENT DOCUMENTS

| | | | | |
|---|---|---|---|---|
| 5,646,864 A | * | 7/1997 | Whitney | H04Q 3/0075 714/47.2 |
| 5,661,668 A | * | 8/1997 | Yemini | G06F 11/2257 714/39 |
| 5,748,098 A | * | 5/1998 | Grace | H04Q 3/0075 709/224 |
| 6,023,571 A | * | 2/2000 | Matsumoto | G06N 5/025 703/2 |
| 6,049,792 A | * | 4/2000 | Hart | G06F 9/453 706/11 |

(Continued)

OTHER PUBLICATIONS

U.S. Appl. No. 17/238,536, filed Apr. 23, 2021.
U.S. Appl. No. 17/239,261, filed Apr. 23, 2021.
U.S. Appl. No. 17/238,486, filed Apr. 23, 2021.

*Primary Examiner* — Sharon S Lynch
(74) *Attorney, Agent, or Firm* — Perkins Coie LLP

(57) ABSTRACT

Methods and systems are described herein for detecting anomalous access to system resources. An anomaly detection system may access system events from one or more computing devices and may generate entries from the system events. Each entry may include a corresponding timestamp indicating a time when a corresponding system event occurred, a corresponding user identifier indicating a user account within a computing environment associated with the corresponding system event, a corresponding location identifier indicating a location within the computing environment, and a corresponding action identifier indicating an action that the user account performed with respect to the location or an object within the computing environment. The generated entries may be aggregated and input into an anomaly detection model to obtain anomalous activity identified by the model.

17 Claims, 8 Drawing Sheets

(56) References Cited

U.S. PATENT DOCUMENTS

| | | | | |
|---|---|---|---|---|
| 6,295,525 | B1* | 9/2001 | Hart | G06F 9/453 706/45 |
| 6,920,468 | B1* | 7/2005 | Cousins | G06F 16/2477 707/999.203 |
| 7,383,191 | B1* | 6/2008 | Herring | H04L 43/10 705/1.1 |
| 8,578,490 | B2* | 11/2013 | Moran | H04L 63/1425 707/669 |
| 10,419,450 | B2* | 9/2019 | Muddu | H04L 43/062 |
| 10,437,831 | B2* | 10/2019 | De-Levie | G06F 16/285 |
| 10,621,346 | B1* | 4/2020 | Singh | H04L 63/145 |
| 10,673,880 | B1* | 6/2020 | Pratt | H04L 63/1433 |
| 10,776,196 | B2* | 9/2020 | Ohana | G06F 11/0709 |
| 11,106,789 | B2* | 8/2021 | Kraus | H04L 63/1416 |
| 11,294,756 | B1* | 4/2022 | Sadrieh | G06N 3/047 |
| 11,561,959 | B2* | 1/2023 | Marathe | G06F 11/3419 |
| 11,588,834 | B2* | 2/2023 | Bowditch | H04L 67/306 |
| 2007/0157315 | A1* | 7/2007 | Moran | H04L 63/1425 726/23 |
| 2008/0189225 | A1* | 8/2008 | Herring | H04L 43/10 705/400 |
| 2008/0215355 | A1* | 9/2008 | Herring | G06Q 30/0283 705/1.1 |
| 2017/0063884 | A1* | 3/2017 | Seigel | H04L 63/1416 |
| 2017/0063905 | A1* | 3/2017 | Muddu | G06N 7/01 |
| 2017/0339178 | A1* | 11/2017 | Mahaffey | H04L 41/142 |
| 2018/0314835 | A1* | 11/2018 | Dodson | G06F 21/552 |
| 2019/0052672 | A1* | 2/2019 | Kumar | H04L 9/3239 |
| 2019/0155672 | A1* | 5/2019 | Wang | G06F 11/0709 |
| 2019/0236177 | A1* | 8/2019 | Jain | G06F 16/2365 |
| 2019/0245876 | A1* | 8/2019 | Faigon | G06F 21/6209 |
| 2019/0294598 | A1* | 9/2019 | Hsiao | G06F 16/22 |
| 2019/0294719 | A1* | 9/2019 | Beringer | G06F 16/2465 |
| 2019/0294720 | A1* | 9/2019 | Beringer | G06F 16/26 |
| 2019/0294734 | A1* | 9/2019 | Beringer | G06F 16/903 |
| 2019/0312941 | A1* | 10/2019 | Maccini | H04H 60/33 |
| 2020/0007564 | A1* | 1/2020 | Xie | G06F 16/258 |
| 2020/0073740 | A1* | 3/2020 | Ohana | G06F 11/0793 |
| 2020/0097810 | A1* | 3/2020 | Hetherington | G06N 20/20 |
| 2020/0285737 | A1* | 9/2020 | Kraus | G06F 21/552 |
| 2020/0351283 | A1* | 11/2020 | Salunke | G06F 18/217 |
| 2021/0019300 | A1* | 1/2021 | Marathe | G06F 11/3419 |
| 2021/0089927 | A9* | 3/2021 | Ryan | G06F 11/0754 |
| 2021/0406671 | A1* | 12/2021 | Gasthaus | G06F 40/20 |

* cited by examiner

| Timestamp | User Identifier | Location Identifier | Action |
|---|---|---|---|
| 2021-01-01 01:11:15 | UserA | \data\reports\ | Copy |
| 2021-01-01 01:11:18 | UserB | \data\report\ | Write |
| 2021-01-01 01:11:20 | UserA | \data\reports\ | Copy |
| 2021-01-01 01:11:25 | UserA | \data\reports\ | Copy |
| 2021-01-01 01:11:30 | UserA | \data\reports\ | Copy |
| 2021-01-01 01:11:35 | UserA | \data\reports\ | Copy |
| ... | ... | ... | ... |

| Timestamp | User Identifier | Location Identifier | Action |
|---|---|---|---|
| 2021-01-01 01:11:15 | UserA | \data\reports\ | Copy |
| 2021-01-01 01:11:17 | UserA | \data\reports\ | Copy |
| 2021-01-01 01:11:20 | UserA | \data\reports\ | Copy |
| 2021-01-01 01:11:25 | UserA | \data\reports\ | Copy |

310

| Timestamp | User Identifier | Location Identifier | Action |
|---|---|---|---|
| 2021-01-01 01:11:15 | UserB | \data\reports\ | Copy |
| 2021-01-01 01:11:17 | UserB | \data\reports\ | Copy |
| 2021-01-01 01:11:20 | UserB | \data\reports\ | Copy |
| 2021-01-01 01:11:25 | UserB | \data\reports\ | Copy |
| 2021-01-01 01:11:30 | UserB | \data\reports\ | Copy |

| Timeslot | User Identifier | Location Identifier | Action | Value |
|---|---|---|---|---|
| 2021-01-01 01:00:00 | UserA | \data\reports\ | Copy | 4 |
| 2021-01-01 01:00:00 | UserB | \data\report\ | Copy | 5 |
| ... | ... | ... | ... | |

| Timeslot | User Identifier | Location Identifier | Action | Value |
| --- | --- | --- | --- | --- |
| 2021-01-01 01:00:00 | UserA | \data\reports\ | Copy | 100 |
| 2021-01-01 01:00:00 | UserB | \data\report\ | Copy | 5 |
| 2021-01-01 01:00:00 | UserA | \data\reports\ | Delete | 100 |
| 2021-01-01 01:00:00 | UserC | \data\reports\ | Write | 10 |
| 2021-01-01 01:00:00 | UserA | \personal\docs\ | Write | 6 |
| 2021-01-01 01:00:00 | UserD | \data\reports\ | Copy | 4 |
| 2021-01-01 01:00:00 | UserC | \data\prj1\ | Write | 3 |

FIG. 5

ANOMALY DETECTION IN COMPUTING COMPUTING SYSTEM EVENTS

BACKGROUND

Identifying cybersecurity events is crucial to any enterprise, even if a cybersecurity event is identified after occurrence. However, identifying security events has been difficult, as bad actors use ever more sophisticated attacks against computer systems. This may be especially difficult in situations where enterprises are very large, and thousands or even millions of data access events are recorded every day. Current enterprise security solutions use systems that monitor enterprise systems and detect, for example, data access failures. Those data access failures may then be reported as monitoring alerts. However, when there is no login failure, for example, when a bad actor has gained access to an enterprise account, it is very difficult, or in certain cases impossible, for a monitoring system to identify a security breach or other security event.

With the rise of cloud datacenters and cloud providers, enterprises now share datacenters and even physical hardware. For example, one physical server may host multiple virtual servers that may be assigned to different enterprises. That sharing introduces more potential vectors for bad actors to exploit. For example, if a bad actor gains access to an operating system underlying the virtual servers, the bad actor may be able to penetrate multiple enterprises that have virtual servers hosted on that physical server.

SUMMARY

Time series data processing may be used for detecting potential security breaches via an anomaly detection model. When users access (e.g., open, copy, move, delete) system resources, for example, files or folders, those operations may be monitored and recorded in event logs. There may be thousands or millions of those entries depending on the size of the computing environment. When a clever bad actor gains access to login information, the operations that the bad actor performs may not be visible to a monitoring system. However, if those operations are anomalous (e.g., unusual, out of the ordinary, etc.), an anomaly detection system may detect those operations as anomalies in a time series dataset. This detection may be particularly useful in cloud datacenter scenarios for both the cloud datacenter provider and a particular enterprise that is using the cloud datacenter. For example, the cloud datacenter provider may collect system event data for different physical servers that host virtual servers for different enterprises and perform anomaly detection on those events. In another example, each enterprise may collect system events from virtual servers assigned to the enterprise and perform detection on those system events.

Therefore, methods and systems are described herein for detecting anomalous access to system resources. In some embodiments, an anomaly detection system may access system events from one or more computing devices. For example, the system events may be generated by servers, network devices, databases, and/or other suitable devices. The anomaly detection system may access those system events from a central point (e.g., a database), or from the systems themselves. In some embodiments, each system may transmit the entries to the anomaly detection system and/or to a central point (e.g., a server hosting a database). The central point may transmit the entries to the anomaly detection system. In some embodiments, data collection may be performed in a cloud datacenter environment. Thus, those system events may be collected from virtual servers around the enterprise.

The anomaly detection system may generate entries (e.g., to be stored in a table) from the system events. Each entry may include a corresponding timestamp indicating a time when a corresponding system event occurred, a corresponding user identifier indicating a user account within a computing environment associated with the corresponding system event, a corresponding location identifier indicating a location (e.g., folder, bucket, or other suitable location) within the computing environment, and a corresponding action identifier indicating an action (e.g., copy, move, delete, or another suitable action) that the user account performed with respect to the location or an object (e.g., file, folder, bucket, or other suitable object) within the computing environment. That data may be stored in different fields within each generated entry. In another example, fewer or more fields may be stored in the entry. That is, a location field and/or object field may be excluded, while other possible fields may be included. For example, other fields from the system event may be extracted and added to the entry.

In some embodiments, the anomaly detection system may extract data from the system events in chronological order. For example, the anomaly detection system may iterate through events, locate the event with the earliest timestamp, and extract data from that event. In other words, the anomaly detection system may first access the system event that has the earliest timestamp as compared with other system events, and extract, from that system event, a timestamp, a user identifier, a location identifier, and an action identifier. The anomaly detection system may store the entry, for example, in memory, and may repeat this process for other events, storing the extracted data into a chronological order dataset.

The anomaly detection system may split the time period for which the system events have been accessed into time intervals. For example, a time period of system events may be two weeks and the anomaly detection system may split the one week into hourly intervals. In another example, the time period may be ninety days and the anomaly detection system may split the ninety days into daily intervals. The anomaly detection system may split the time period based on user input or may automatically determine a plurality of time intervals for a time period for the plurality of entries.

The anomaly detection system may then transform the entries into a time series dataset based on unique combinations of a user identifier, a location identifier, and an action identifier and based on an aggregated value for each unique combination. For example, it may be desirable to understand anomalous activity for a specific user (e.g., User A) as it pertains to specific location (e.g., Bucket B) and performance of a specific action (e.g., Action C). In this instance, the anomaly detection system may collect the data for this combination of fields and aggregate the data over a time period (e.g., one hour). Thus, if User A took action C in association with bucket B fifty times in a certain hour (e.g., User A copied fifty files from Folder B between 3 PM and 4 PM), the anomaly detection system may generate an aggregated entry for this combination of fields with a value of fifty for the time period between 3 PM and 4 PM.

In some embodiments, the aggregation process may be performed over a single field instead of multiple fields. For example, it may be useful to know how various users accessed the system without regard to the location within that system or the type of action that was taken. Thus, the anomaly detection system may transform the data only based on the user identifier field. For example, if user A performed any fifty actions (even if those actions are different) between 3 PM and 4 PM, the anomaly detection system may generate an aggregated entry for that user identifier with a value of fifty.

In some embodiments, the data being transformed may be an average of all entry-values within the time range. That is, the transformation operation may aggregate the values based on count (e.g., a number of data points in the time slot), sum (the sum of the values for each data point in the time slot), or an average (the average of the values for each data point in the time slot). In some embodiments, the aggregation values may be a volume size (e.g., in bytes) for each system event. For example, a system event may indicate a copy operation. The copy operation may include a parameter indicating the size of the data being copied/written/move/ deleted/etc. Thus, that size value may be used for aggregating the data. In another example, the aggregation may be performed based on a ratio of volume in/out and the volume mean. For example, some of the events may be write events while other events may be copy events. The write system events may store a value indicating the size of the data written (e.g., a number of bytes), while the copy system events may indicate the size of the data copied or read (e.g., in bytes). Thus, the aggregation may be performed based on the ratio of bytes copied to bytes written for the time slot.

The anomaly detection system may input the time series dataset into an anomaly detection model to obtain one or more timestamps representing one or more anomalies detected by the anomaly detection model. For example, an anomaly detection model may be a machine learning model, or another suitable decision model that can output timestamps that represent times of occurrence for potential anomalies. In some embodiments, the anomaly detection model may output timestamps and probabilities that indicate, for each timestamp, the probability of an anomaly at the time corresponding to the timestamp. Furthermore, the anomaly detection system may compare the probabilities with a threshold and remove timestamps from consideration where the probability is too low (e.g., below the threshold number). The anomaly detection system may then generate one or more alerts based on the one or more anomalies and transmit the one or more alerts to an alert processing system.

In some embodiments, the anomaly detection system may perform anomaly detection in response to a request (e.g., from a user device or from a monitoring system). The request may include criteria for anomaly detection. For example, anomaly detection may be requested for a specific user and a specific action, a specific action and a specific location (e.g., bucket), etc. Thus, the request may include those parameters which may be extracted by the anomaly detection system and used to generate the time series dataset.

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data), unless the context clearly dictates otherwise.

BRIEF DESCRIPTION OF THE DRAWINGS

FIG. 2 illustrates a table of entries generated from system events, in accordance with one or more embodiments of this disclosure.

FIG. 3 shows tables that illustrate possible sets of entries for each parameter and/or unique parameter combinations, in accordance with one or more embodiments.

FIG. 4 shows a table that illustrates aggregated entries stored as a time series dataset, in accordance with one or more embodiments.

FIG. 5 shows a table that illustrates a portion of a time series dataset of aggregated entries, in accordance with one or more embodiments.

DETAILED DESCRIPTION OF THE DRAWINGS

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
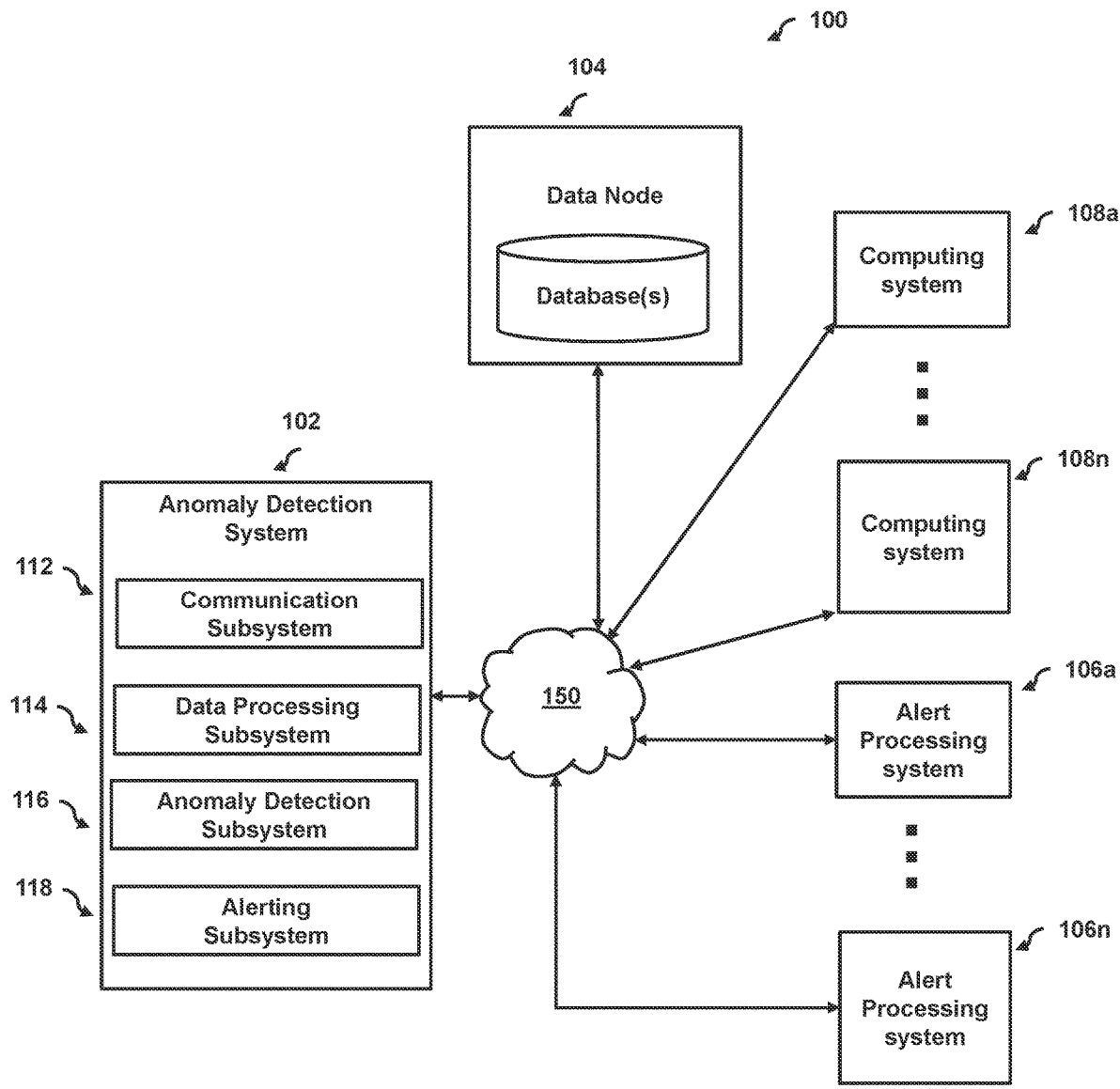
FIG. 1 shows an illustrative system for detecting anomalous access to system resources, in accordance with one or more embodiments of this disclosure.

FIG. 1 shows environment 100, which includes a system for detecting anomalous access to system resources. Environment 100 includes an anomaly detection system 102, data node 104, computing devices 108a-108n, and alert processing systems 106a-106n connected by network 150. Anomaly detection system 102 may execute instructions for detecting anomalous access to system resources. Anomaly detection system 102 may include software, hardware or a combination of the two. For example, anomaly detection system 102 may be a physical server or a virtual server that is running on a physical computer system.

Data node 104 may store time series data (e.g., in one or more databases). Data node 104 may include software, hardware or a combination of the two. For example, data node 104 may be a physical server, or a virtual server that is running on a physical computer system. Alert processing systems 106a-106n may process alerts generated based on detected anomalies. Alert processing systems 106a-106n may include software, hardware or a combination of the two. For example, each alert processing system 106a-106n may be a physical server, or a virtual server that is running on a physical computer system. Anomaly detection system 102, data node 104 and alert processing systems 106a-106n may reside on the same hardware servers, or different hardware servers. In some embodiments, these components may reside on virtual servers. Network 150 may be a local area network, a wide area network (e.g., the Internet) or a combination of the two.

Computing devices 108a-108n generate system events that are used to detect anomalies. As referred to herein, a system event refers to data generated by a computing device that describes an event that occurred and was detected on the computing device. For example, a system event may be an access by a user of a specific area of the system, and/or a specific file or folder on the system. In another example, a system event may be generated when there is an error condition that is detected on the system. In some embodiments, system events may be generated by software (e.g., operating system) being executed by the system, while, in some embodiments, system events may be generated by hardware within the system. System events are sometimes referred to as entries in log files. These log files may be stored on the system that generated the log files and/or on another system (e.g., the originating system may transmit the log files or each log entry (e.g., event) to another device). As referred to herein, a computing device refers to an electronic device that is able to perform computational operations. For example, a computing device may be a server (physical or virtual), a switch, a router, a hub, a computer, a laptop, an electronic tablet, a smart phone, etc. Some computing devices may be physical devices, while some may be logical devices (e.g., virtual servers, virtual desktops, virtual routers, and/or other suitable devices).

Anomaly detection system 102 may be configured to access a plurality of system events from one or more computing devices. For example, computing devices 108a-108n may generate system events as those systems are operating and communicating with other systems. Each computing system may store generated system events in memory and/or storage. In some embodiments, anomaly detection system 102 may request events from computing devices 108a-108n, while, in some embodiments, those devices may transmit their system events to data node 104. Data node 104 may transmit those system events to anomaly detection system 102. In both cases, system event transmission may be upon request from anomaly detection system 102 or without a request (e.g., periodically).

The anomaly detection system may access the system events using communication subsystem 112. Communication subsystem 112 may include software components, hardware components, or a combination of both. For example, communication subsystem 112 may include a network card (e.g., a wireless network card and/or a wired network card) that is coupled with software to drive the card. Communication subsystem 112 may store the system events in a particular format that can be interpreted, and extraction functions may be used to extract the data. For example, the system events may be stored in one or more XML files, or in another data structure. When the system events are accessed/received, communication subsystem 112 may pass the system events to data processing subsystem 114.

Data processing subsystem 114 may include software components, hardware components, or a combination of both. For example, data processing subsystem 114 may include software components that access received system events in memory and/or storage, and may use a processor to perform its operations. The data processing subsystem may perform the operations described below.

Data processing subsystem 114 may generate, from the plurality of system events, a plurality of entries. Data processing subsystem 114 may generate the entries in a variety of ways. In some embodiments, each entry of the plurality of entries may include a corresponding timestamp indicating a time when a corresponding system event occurred, a corresponding user identifier indicating a user account within a computing environment associated with the corresponding system event, a corresponding location identifier indicating a location within the computing environment, and a corresponding action identifier indicating an action that the user account performed with respect to the location within the computing environment.

FIG. 2 illustrates table 200 that includes a plurality of rows representing a plurality of entries, and a plurality of columns representing fields in each entry. Row 210 and row 212 represent two unique entries storing data extracted from system events. Each row may include column 202 storing a timestamp. The timestamp may be stored in any format (e.g., year-month-date Hour:Minute:Second). Each row may also include column 204, which stores a user identifier for each entry. The user identifier may belong to the user that performs the action associated with the system event. Each row may also include column 206, storing a location identifier. Location identifier may be a folder, directory, bucket, or other location on a computing device. In addition, each row may include column 208, storing an action that the user performed. For example, the action may be copy, write, move, delete, open, read, or any other suitable action.

In some embodiments, data processing subsystem 114 may perform the following actions when generating the entries. Data processing subsystem 114 may access a first system event of the plurality of system events that has the earliest timestamp as compared with other system events in the plurality of system events. For example, data processing subsystem 114 may iterate through a data structure that stores the events and compare the timestamps of all of the events. Based on this comparison, data processing subsystem 114 may identify the earliest timestamp, and the system event associated with the earliest timestamp.

Data processing subsystem 114 may extract, from the first system event of the plurality of system events, a first timestamp, a first user identifier, a first location identifier, and a first action identifier. For example, if the system events are stored in a database, data processing subsystem 114 may request data associated with the specific event with the earliest timestamp. In another example, if the system events are stored in a structured file (e.g., XML file), data processing subsystem 114 may extract the portion of the structure of the file storing the timestamp, user identifier, location identifier, and an action identifier.

Data processing subsystem 114 may store, in memory, a first entry that includes the extracted timestamp, user identifier, location identifier, and the action identifier. Data processing subsystem 114 may perform this process for some or all other system events, for example, in a ninety-day period. A person skilled in the art would understand that another time frame may be used in this process (e.g., 30 days, 120 days, or another suitable time period). As data processing subsystem 114 stores the entries in memory, it may store them in chronological order. For example, a second entry with a second earliest timestamp may be stored directly following the first entry. The third entry with the third earliest timestamp may be stored directly following the second entry, and so forth.

In some embodiments, data processing subsystem 114 may generate, for the plurality of system events, a plurality of entries in another way. For example, each entry of the plurality of entries may include a corresponding timestamp, and one or more parameters associated with a corresponding system event. For example, data processing subsystem 114 may receive and/or retrieve indications of one or more parameters to be included in each entry. The indications may be retrieved from a predetermined configuration, and/or received from an input device. In some embodiments, data processing subsystem 114 may request and/or receive the parameters from another computing device (e.g., data node 104). Thus, data processing subsystem 114 may retrieve those parameters without retrieving other parameters from the system events.

For example, anomaly detection may only be needed for a specific user without regard to a location that the user accessed, or a type of operation that the user performed. Thus, data processing subsystem 114 may extract a timestamp and user identifier from the system events without extracting other parameters (e.g., without extracting the location identifier, action identifier, etc.). The resulting data may look similar to data of table 200 in FIG. 2, but without column 206 and column 208. A person skilled in the art would understand that data processing subsystem 114 may extract any combination of parameters from system events. For example, a timestamp, a user identifier, and a location may be the extracted parameters. In another example, a timestamp, and a location may be the extracted parameters. In yet another example, a timestamp and an action may be the extracted parameters. When the parameters are extracted from system events, they may be stored in chronological order in a data structure, for example, as illustrated in FIG. 2 and described above.

In some embodiments, data processing subsystem 114 may select the parameters based on a request (e.g., from a user or from a monitoring system). For example, data processing subsystem 114 may receive an anomaly detection request via communication subsystem 112. The anomaly detection request may be received from a computing device associated with a user (e.g., a computer, a smartphone, an electronic tablet, or another suitable device). In some embodiments, the anomaly detection request may be received from a monitoring system (e.g., in response to the monitoring system receiving an alert). The anomaly detection request may include anomaly detection criteria (e.g., a combination of parameters for performing anomaly detection). Data processing subsystem 114 may determine the plurality of parameters for the time series dataset based on the detection criteria.

In some embodiments, data processing subsystem 114 may determine the plurality of parameters based on the detection criteria by performing the following actions. Data processing subsystem 114 may extract, from a plurality of fields of the detection criteria, a plurality of values. For example, the request may include one or more fields with a plurality of values corresponding to parameters within the system events. Thus, data processing subsystem 114 may compare each of the plurality of values with a plurality of fields within the plurality of entries. For example, the values may be a user identifier and a location identifier, a user identifier and an action, or another suitable combination of values. The system events and, thus, the entries may also include fields corresponding to a user identifier, location identifier, as well as other fields. Thus, based on comparing those values, data processing subsystem 114 may determine that the plurality of values matches a subset of the plurality of fields. Data processing subsystem 114 may assign the subset of the plurality of fields as the plurality of parameters.

In some embodiments, data processing subsystem 114 may transform the plurality of entries into a time series dataset based on unique combinations of a user identifier, location identifier, and action identifier and also based on an aggregated value for each unique combination of user identifier, location identifier, and action identifier. Data processing subsystem 114 may transform the stored entries according to a time interval. For example, a time interval may be an hour, three hours, twelve hours, one day, one week, or another suitable time interval. In some embodiments, data processing subsystem may perform the transform operation on parameters different from a user identifier, location identifier, and action identifier. For example, the transformation may be performed on only on a combination of the user identifier and location identifier or user identifier and action identifier. That is, the transformation may be performed based on any combination of parameters available within the entries.

Data processing subsystem 114 may perform the following operations during the transformation process. Data processing subsystem 114 may start the process by selecting a first entry from the time series dataset. The first entry may be associated with a first timestamp that is the earliest timestamp in the time series dataset. For example, the time series dataset may be stored as a data structure (e.g., an array, a linked list, a stack, a queue, or another suitable data structure). The entries may be stored chronologically within the data structure based on the timestamp. Thus, data processing subsystem 114 may iterate, chronologically, through the plurality of entries until a second entry with a second timestamp which is the last timestamp within a time slot associated with the first timestamp.

Prior to chronologically iterating through the entries, data processing subsystem 114 may determine the time slot for the transform operation. The transformation operation may be referred to as an aggregation. To determine the time slot for aggregation, data processing subsystem 114 may retrieve the time interval. For example, the time interval may be one hour. When the time interval is retrieved, data processing subsystem 114 may round down the first timestamp to the time interval. For example, if the first timestamp is 01:11:15, and the time interval is one hour, data processing subsystem 114 may round down the 01:11:15 to 01:00:00. In addition, data processing subsystem 114 may round up the first timestamp based on the time interval. For example, if the first timestamp is 01:11:15, and the time interval is one hour, data processing subsystem 114 may round up the 01:11:15 to 02:00:00. Thus, the time slot would be from 01:00:00 to 02:00:00. Therefore, data processing subsystem 114 may iterate chronologically through the entries until the first entry that is found beyond the time slot. When that entry is found, all the other entries are selected for aggregation.

In some embodiments, data processing subsystem 114 may aggregate an average of all entry-values within the time range of aggregation. Data processing subsystem 114 may aggregate the values based on count (e.g., a number of data points in the time slot), sum (the sum of the values for each data point in the time slot), or an average (the average of the values for each data point in the time slot). In some embodiments, the aggregation values may be a volume size (e.g., in bytes) for each system event. For example, a system event may indicate a copy operation. The copy operation may include a parameter indicating the size of the data being copied/written/move/deleted/etc. Thus, data processing subsystem 114 may use that size value for aggregating the data. In another example, data processing subsystem 114 may perform the aggregation based on a ratio of volume in/out and the volume mean. For example, some of the events may be write events while other events may be copy events. The write system events may store a value indicating the size of the data written (e.g., a number of bytes), while the copy system events may indicate the size of the data copied or read (e.g., in bytes). Thus, data processing subsystem 114 may aggregate the data based on the ratio of bytes copied to bytes written for the time slot.

In some embodiments, data processing subsystem 114 may store the one or more counts of entries in association with a time slot comprises storing for the time slot a corresponding entry for each unique combination of parameters. Each entry may include a first field for storing a corresponding timestamp, a second field for storing a corresponding count, and a plurality of fields for storing each parameters of a given combination of parameters.

Data processing subsystem 114 may identify one or more sets of entries having a unique combination of the user identifier, the location identifier, and the action identifier. For example, FIG. 2 illustrates entries 210, 212, 214, 216, 218, and 220. Of those entries, only entry 212 would not match the unique combination of user identifier, location identifier and action identifier. Every entry except entry 212 have UserA for the user identifier \data\reports\ as location identifier, and Copy as an action identifier. Thus, they all have that unique combination. However, entry 212 has UserB for the user identifier and Write as the action. Therefore, entry 212 does not match the unique combination.

In some embodiments, data processing subsystem 114 may identify one or more sets of entries having a unique combination of the plurality of parameters. For example, the unique combination does not have to include the user identifier, the location identifier, and the action identifier. The unique combination may be a unique combination of any parameters within an entry. In one example, the unique combination may be a user identifier and a location identifier. In this particular example, entries that have the same user identifier and the same location identifier may be identified. As shown in FIG. 2, entries 210, 214, 216, 218, and 220 may be identified, while entry 212 may not, as it has a different user identifier. This combination may be useful when trying to detect any anomalies based on the user identifier for a specific location.

In some embodiments, the unique combination may be a location identifier and an action identifier, which may be useful to understand any anomalous actions with respect to a specific location (e.g., without regard to the user identifier). In this example, entries that have the same action identifier and the same location identifier may be identified. As shown in FIG. 2, entries 210, 214, 216, 218, and 220 may be identified, while entry 212 may not, as it has a different action identifier. A person skilled in the art would understand that entries may be generated using any system event parameters available for extraction and, thus, any combinations of parameters may be used as part of a unique combination. For example, another parameter that may be used in combination with a user identifier and another parameter, or by itself is the computing system identifier, which may be useful for detecting anomalous access to a particular computer system. Yet another parameter that may be used in combination with a user identifier, or with another parameter, or by itself is the success/failure parameter. This parameter may be useful for detecting anomalous numbers of failure and/or access to specific system resources (e.g., folder, bucket, file, etc.).

In some embodiments, a single parameter may be used in the transformation operation. For example, the user identifier parameter may be used to aggregate the entries. This may be useful to identify any anomalous activity associated with specific user accounts without regard to the action or locations being accessed by the user account. As shown in FIG. 2, entries 210, 214, 216, 218, and 220 may be identified, while entry 212 may not as it has a different user identifier.

In some embodiments, data processing subsystem 114 may continue to identify sets of entries that have a unique parameter, or unique combination of parameters (e.g., user identifier, location identifier, and/or action identifier) until all the unique combinations have been identified. Thus, when the entries for a particular time slot have all been processed, there may be one or more sets of entries, each having a unique parameter or combination of parameters.

In some embodiments, data processing subsystem 114 may determine one or more sums of entries within the one or more sets of entries. For example, data processing subsystem 114 may iterate through all of the entries in each set for each time slot, and count those entries. FIG. 3 shows tables 300 and 310, which illustrate possible sets of entries for each parameter and/or unique parameter combination. Table 300 may illustrate a set of entries with a unique combination of parameters, which include the User Identifier, Location Identifier, and/or Action Identifier (UserA, \data\reports\, and Copy). Table 310 may illustrate another set of entries with a unique combination of parameters, which include the User Identifier, Location Identifier, and/or Action Identifier (UserB, \data\reports\, and Copy).

In some embodiments, tables 300 and 310 may illustrate sets of entries generated based on a single parameter (user identifier). The user identifier entries in table 300 may be UserA, while user identifier for entries in table 310 may be user B. Thus, data processing subsystem 114 may add the entries in table 300 with the resulting value being 4, and add entries in table 310 with the resulting value being 5.

Data processing subsystem may store one or more sums of entries in association with a time slot. FIG. 4 shows a table 400 that illustrates aggregated entries stored as a time series dataset. Table 400 may include row 410 and row 412. Row 410 may include an aggregated value for one unique combination of parameters, while row 412 may include an aggregated value for another unique combination of parameters. For example, row 410 may include a unique combination having UserA as the user identifier, \data\reports\ as a location identifier and Copy as an action identifier. In another example, row 410 may be based on a unique parameter for a user (UserA) while row 412 may be based on another unique parameter (UserB). In some embodiments, the unique combination or the parameter may be hashed so that the data can be stored in a simpler and more efficient way. FIG. 5 shows table 500, which illustrates a portion of a time series dataset of aggregated entries. Row 510 includes an entry with aggregated data for one or more parameters, while row 512 includes an entry with aggregated data for another parameter or parameters. As shown in FIG. 5, the entries are for the 01:00:00 time slot on Jan. 1, 2021.

When the time series dataset is ready (e.g., it has been generated and aggregated), data processing subsystem 114 may pass the time series dataset to anomaly detection subsystem 116. Anomaly detection subsystem 116 may input the time series dataset into an anomaly detection model to obtain one or more timestamps representing one or more anomalies detected by the anomaly detection model. In some embodiments the anomaly detection model may be a machine learning model.

Figure 6:
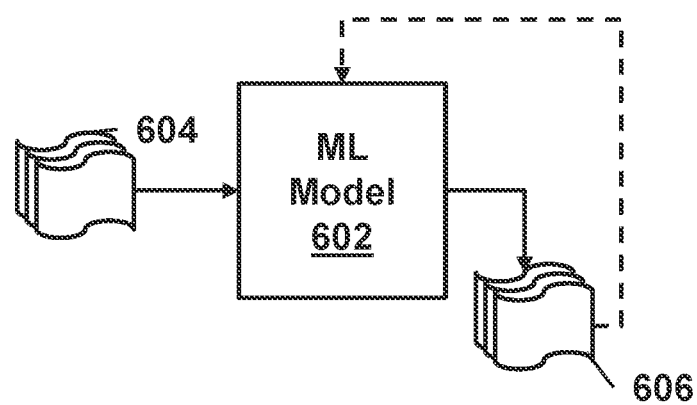
FIG. 6 illustrates an exemplary anomaly detection model based on machine learning, in accordance with one or more embodiments.

FIG. 6 illustrates an exemplary anomaly detection model based on machine learning. Machine learning model 602 (e.g., anomaly detection model) may take input 604 (e.g., time series dataset), and may output timestamps 606 (sometimes referred to as output parameters) corresponding to anomalies detected by the model. Timestamps 606 may be output together with a probability that a particular timestamp corresponds to an anomaly detected in the time series dataset.

The output parameters may be fed back to the machine learning model as input to train the machine learning model (e.g., alone or in conjunction with user indications of the accuracy of outputs, labels associated with the inputs, or with other reference feedback information). The machine learning model may update its configurations (e.g., weights, biases, or other parameters) based on the assessment of its prediction (e.g., of an information source), and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

In some embodiments, machine learning model 602 may be trained to perform anomaly detection using one or more supervised techniques. As an example, a training dataset including entries labeled with "anomalous," "normal," or one or more other labels or label sets may be obtained and used to train machine learning model 602. In one use case, an entry without an anomaly may be labeled as "nominal," while an entry including anomalous data may be labeled "anomaly." In another use case, a Boolean may be used to label anomalous entries versus normal entries such that a "True" label represents an entry including anomalous value(s), and a "False" label represents an entry without an anomalous value.

In some embodiments, machine learning model 602 may be trained to perform anomaly detection using one or more unsupervised techniques. For example, an isolation forest algorithm or other decision tree algorithm may be used to configure machine learning model 602 based on a training dataset in an unsupervised manner. In one use case, an isolation or other decision tree (e.g., corresponding to machine learning model 602) may be trained or generated by selecting one or more features from the training dataset (e.g., selecting one or more parameters of the training dataset) and randomly selecting one or more values for a selected feature for splitting the data of that feature (e.g., randomly selecting a value between maximum and minimum values of that feature). In this way, for example, the decision tree will have a high likelihood of shorter paths in decision trees for anomalous data points, thereby identifying data points corresponding to anomalous data.

In some embodiments anomaly detection subsystem 118 may select an anomaly detection model based on a temporal trait associated with the timeseries data. Selecting an anomaly detection model based on a temporal trait as well as other techniques associated with anomaly detection are described in a U.S. Patent Application Ser. No. 17/239,261, filed on Apr. 23, 2021, entitled "Automatic Model Selection for a Time Series," which is hereby incorporated herein by reference in its entirety. Other anomaly detection and processing techniques are described in U.S. Patent Application Ser. No. 17/238,536, filed on Apr. 23, 2021, entitled "Anomaly Detection Data Workflow for Time Series Data," and U.S. Patent Application Ser. No. 17/238,486, filed on Apr. 23, 2021, entitled "Anomaly Detection in a Split Timeseries Dataset," which are hereby incorporated herein by reference in their entireties.

When the output of the machine learning model is received, anomaly detection subsystem 116 may pass the received data to alerting subsystem 118. Alerting subsystem 118 may generate one or more alerts based on the one or more anomalies. For example, alerting subsystem 118 may generate one alert for each detected anomaly. The alert may include time series data associated with the timestamp for which the anomaly was detected. In some embodiments, alerting subsystem 118 may generate one alert for all detected anomalies, and include the time series data associated with each timestamp.

In some embodiments, the output of the anomaly detection model may be timestamps or time slots for each probability, or a score that the particular timestamp or time slot is associated with a value indicating an anomaly. For each time series dataset there may be multiple anomalies or no anomalies detected. In some embodiments, data processing subsystem 114 may determine which timestamps are associated with anomalies based on a threshold probability or score value, sometimes referred to as an anomaly confidence threshold. That is, if the associated probability or score is higher than the anomaly confidence threshold, data processing subsystem 114 may identify a particular timestamp as an anomaly. For example, data processing subsystem 114 may receive, from the anomaly detection model and based on the anomaly time series dataset, one or more probabilities corresponding to the one or more anomalies detected by the anomaly detection model, and retrieve the anomaly confidence threshold. The anomaly confidence value may be a threshold probability or a threshold score that determines whether a given probability corresponds to a positive detection of an anomaly. Data processing subsystem 114 may remove from the one or more anomalies those anomalies that do not meet the anomaly confidence threshold.

When the alert or alerts are generated, alerting subsystem 118 may pass the alert or alerts on to communication subsystem 112. When the alerts have been created, alerting subsystem 118 may pass the alert or alerts on to communication subsystem 112. Communication subsystem 112 may transmit (e.g., via network 150) the alert or alerts to an appropriate alert processing system (e.g., alert processing system 106a).

Computing Environment

Figure 7:
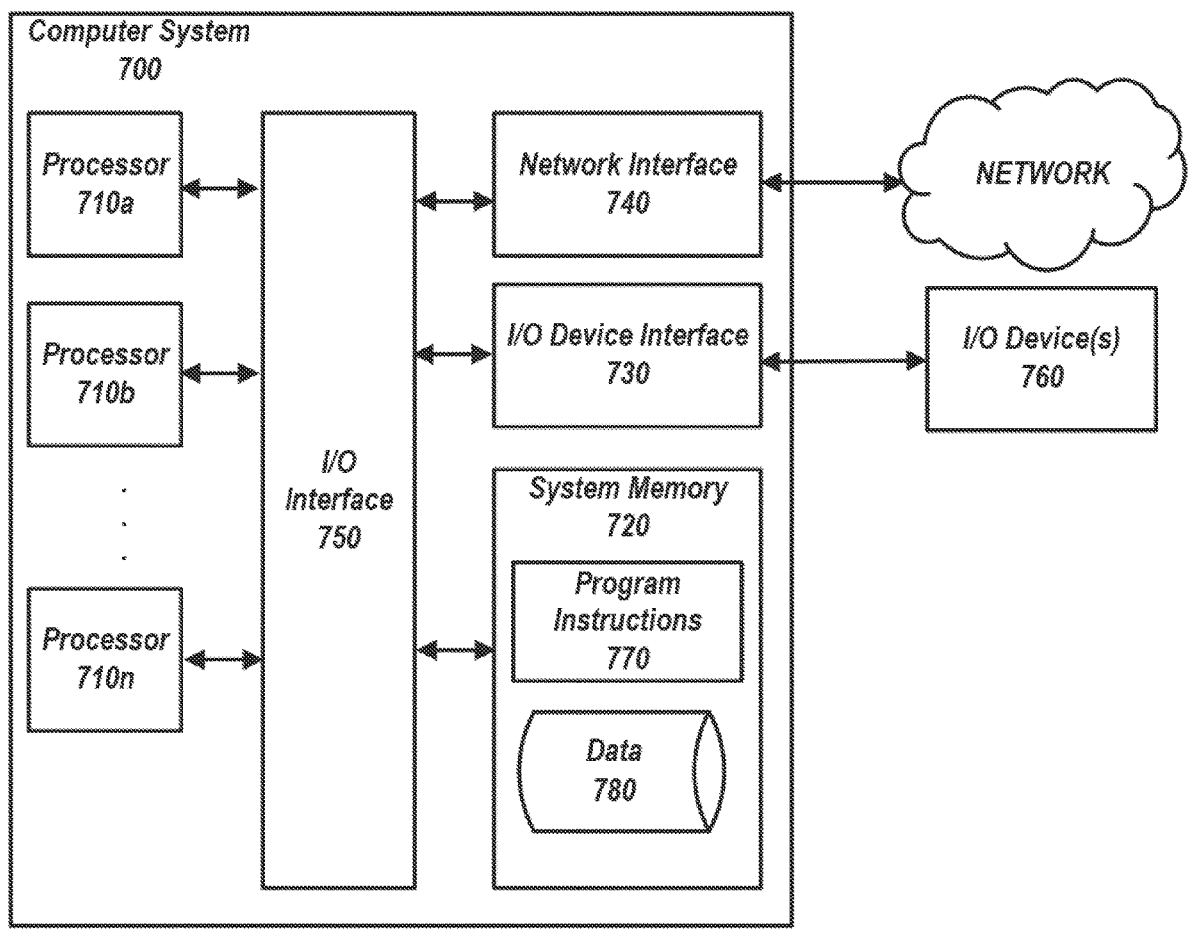
FIG. 7 shows an example computing system that may be used in accordance with one or more embodiments.

FIG. 7 shows an example computing system that may be used in accordance with some embodiments of this disclosure. In some instances, computing system 700 is referred to as a computer system. A person skilled in the art would understand that those terms may be used interchangeably. The components of FIG. 7 may be used to perform some or all operations discussed in relation with FIGS. 1-6. Furthermore, various portions of the systems and methods described herein may include or be executed on one or more computer systems similar to computing system 700. Further, processes and modules described herein may be executed by one or more processing systems similar to that of computing system 700.

Computing system 700 may include one or more processors (e.g., processors 710a-710n) coupled to system memory 720, an input/output I/O device interface 730, and a network interface 740 via an input/output (I/O) interface 750. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computing system 700 may be a uni-processor system including one processor (e.g., processor 710a), or a multi-processor system including any number of suitable processors (e.g., 710a-710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 700 may include a plurality of computing devices (e.g., distributed computer systems) to implement various processing functions.

I/O device interface 730 may provide an interface for connection of one or more I/O devices 760 to computer system 700. I/O devices may include devices that receive input (e.g., from a user) or output information (e.g., to a user). I/O devices 760 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computer system 700 through a wired or wireless connection. I/O devices 760 may be connected to computer system 700 from a remote location. I/O devices 760 located on remote computer systems, for example, may be connected to computer system 700 via a network and network interface 740.

Network interface 740 may include a network adapter that provides for connection of computer system 700 to a network. Network interface 740 may facilitate data exchange between computer system 700 and other devices connected to the network. Network interface 740 may support wired or wireless communication. The network may include an electronic communication network, such as the Internet, a local area network (LAN), a wide area network (WAN), a cellular communications network, or the like.

System memory 720 may be configured to store program instructions 770 or data 780. Program instructions 770 may be executable by a processor (e.g., one or more of processors 710a-710n) to implement one or more embodiments of the present techniques. Instructions 770 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site, or distributed across multiple remote sites and interconnected by a communication network.

System memory 720 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 720 may include a non-transitory computer readable storage medium that may have program instructions stored thereon that are executable by a computer processor (e.g., one or more of processors 710a-710n) to cause the subject matter and the functional operations described herein. A memory (e.g., system memory 720) may include a single memory device and/or a plurality of memory devices (e.g., distributed memory devices).

I/O interface 750 may be configured to coordinate I/O traffic between processors 710a-710n, system memory 720, network interface 740, I/O devices 760, and/or other peripheral devices. I/O interface 750 may perform protocol, timing, or other data transformations to convert data signals from one component (e.g., system memory 720) into a format suitable for use by another component (e.g., processors 710a-710n). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 700, or multiple computer systems 700 configured to host different portions or instances of embodiments. Multiple computer systems 700 may provide for parallel or sequential processing/execution of one or more portions of the techniques described herein.

Those skilled in the art will appreciate that computer system 700 is merely illustrative, and is not intended to limit the scope of the techniques described herein. Computer system 700 may include any combination of devices or software that may perform or otherwise provide for the performance of the techniques described herein. For example, computer system 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 700 may also be connected to other devices that are not illustrated, or may operate as a stand-alone system. In addition, the functionality provided by the illustrated components may in some embodiments be combined in fewer components, or distributed in additional components. Similarly, in some embodiments, the functionality of some of the illustrated components may not be provided or other additional functionality may be available.

Operation Flow

Figure 8:
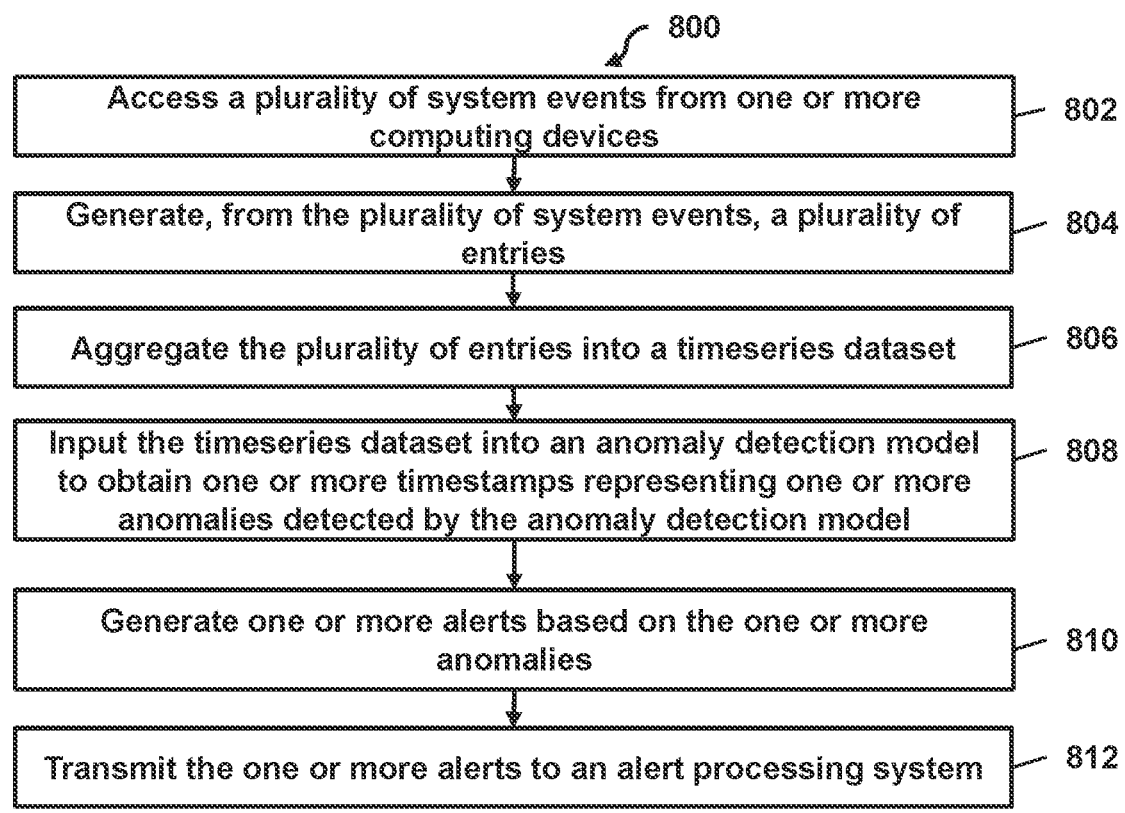
FIG. 8 shows a flowchart of the steps involved in detecting anomalous access to system resources, in accordance with one or more embodiments.

FIG. 8 is a flowchart 800 of operations for detecting anomalous access to system resources. The operations of FIG. 8 may use components described in relation to FIG. 7. At 802, an anomaly detection system accesses a plurality of system events from one or more computing devices. For example, the anomaly detection system may be hosted on a computer system (e.g., computer system 700). The anomaly detection system may access the system events using network interface 740 through a network (e.g., network 150 of FIG. 1). The anomaly detection system may access the system events from data node 104 and/or from computer systems 108a-1-8n.

At 804, the anomaly detection system generates, from the plurality of system events, a plurality of entries. In some embodiments, each entry of the plurality of entries includes a corresponding timestamp, and a corresponding one or more parameters associated with a corresponding system event. In some embodiments, each entry of the plurality of entries may include a corresponding timestamp indicating a time when a corresponding system event occurred, a corresponding user identifier indicating a user account within a computing environment associated with the corresponding system event, a corresponding location identifier indicating a location within the computing environment, and a corresponding action identifier indicating an action that the user account performed with respect to the location within the computing environment. The anomaly detection system may use one or more processors 710a-710n to perform the generation of the entries, and may store the entries in system memory 720.

At 806, the anomaly detection system aggregates the plurality of entries into a time series dataset. In some embodiments, the aggregating operation may be performed based on the corresponding one or more parameters, the plurality of entries into a time series dataset. In other embodiments, the aggregating operation may be performed based on unique combinations of a user identifier, a location identifier, and an action identifier. The anomaly detection system may use one or more processors 710a-710n to perform the generation of the entries, and may store the entries in system memory 720.

At 808, the anomaly detection system inputs the time series dataset into an anomaly detection model to obtain one or more timestamps representing one or more anomalies detected by the anomaly detection model. For example, the anomaly detection system may use I/O interface 750 to perform the input operation, and/or use the network (e.g., network 150) when the anomaly detection model (e.g., ML Model 602) is located on a different computing device.

At 810, the anomaly detection system generates one or more alerts based on the one or more anomalies. The anomaly detection system may generate the alerts using one or more processors 710a-710n, and store the alerts in system memory 720. At 812, the anomaly detection system transmits the one or more alerts to an alert processing system. For example, the anomaly detection system may transmit the alerts to one or more alter processing systems 106a-106n.

Although the present invention has been described in detail for the purpose of illustration based on what is currently considered to be the most practical and preferred embodiments, it is to be understood that such detail is solely for that purpose, and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: accessing a plurality of system events generated by one or more computing devices; generating, for the plurality of system events, a plurality of entries, wherein each entry of the plurality of entries includes a corresponding timestamp and a corresponding one or more parameters associated with a corresponding system event; aggregating, using a time interval and based on the corresponding one or more parameters, the plurality of entries into a time series dataset; inputting the time series dataset into an anomaly detection model to obtain one or more timestamps representing one or more anomalies detected by the anomaly detection model; generating one or more alerts based on the one or more anomalies; and transmitting the one or more alerts to an alert processing system.

2. The method of any of the preceding embodiments, wherein the corresponding one or more parameters comprise a plurality of parameters.

3. The method of any of the preceding embodiments, wherein generating the plurality of entries comprises: accessing a first system event of the plurality of system events, wherein the first system event has an earliest timestamp as compared with other system events in the plurality of system events; extracting, from the first system event of the plurality of system events, a first timestamp and a first plurality of parameters; and storing, in memory, a first entry comprising the first timestamp, and the first plurality of parameters.

4. The method of any of the preceding embodiments 6, wherein aggregating the plurality of entries into the time series dataset using the time interval comprises: selecting, a first entry of the plurality of entries, wherein the first entry is associated with a first timestamp that is an earliest timestamp in the time series dataset; iterating, chronologically, through the plurality of entries until a second entry with a second timestamp, wherein the second timestamp is the last timestamp within a time slot associated with the first timestamp; identifying one or more sets of entries having a unique combination of the plurality of parameters; determining one or more sums of entries within the one or more sets of entries; and storing the one or more sums of entries in association with a time slot.

5. The method of any of the preceding embodiments, wherein the corresponding one or more parameters comprise one parameter.

6. The method of any of the preceding embodiments, wherein generating the plurality of entries comprises: accessing a first system event of the plurality of system events, wherein the first system event has an earliest timestamp as compared with other system events in the plurality of system events; extracting, from the first system event of the plurality of system events, a first timestamp and the one parameter; and storing, in memory, a first entry comprising the first timestamp, and the one parameter.

7. The method of any of the preceding embodiments, wherein aggregating the plurality of entries into the time series dataset using the time interval comprises: selecting, a first entry of the plurality of entries, wherein the first entry is associated with a first timestamp that is an earliest timestamp in the time series dataset; iterating, chronologically, through the plurality of entries until a second entry with a second timestamp, wherein the second timestamp is the last timestamp within a time slot associated with the first timestamp; determining a sum of entries starting with the first entry and ending with the second entry; and storing the sum of entries in association with a time slot.

8. The method of any of the preceding embodiments, further comprising: receiving, from the anomaly detection model and based on the time series dataset, one or more probabilities corresponding to the one or more anomalies detected by the anomaly detection model; retrieving an anomaly confidence threshold; and removing from the one or more anomalies those anomalies that do not meet the anomaly confidence threshold.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for detecting anomalous access to system resources, the system comprising:
one or more processors; and
a non-transitory computer-readable storage medium storing instructions, which when executed by the one or more processors cause the one or more processors to:
access a plurality of system events from one or more computing devices;
generate, from the plurality of system events, a plurality of entries, wherein each entry of the plurality of entries includes a corresponding timestamp indicating a time when a corresponding system event occurred, a corresponding user identifier indicating a user account within a computing environment associated with the corresponding system event, a corresponding location identifier indicating a location within the computing environment, and a corresponding action identifier indicating an action that the user account performed with respect to the location within the computing environment;
determine a plurality of equal time intervals for a time period associated with the plurality of entries;
for each time interval of the plurality of equal time intervals, transform a subset of the plurality of entries corresponding to a given equal time interval into a time series dataset based on unique combinations of a user identifier, a location identifier, and an action identifier, wherein the time series dataset comprises a corresponding aggregated value for each unique combination of the user identifier, the location identifier, and the action identifier;
input the time series dataset into an anomaly detection model;
receive, based on inputting the time series dataset comprising each corresponding aggregated value into the anomaly detection model, a plurality of timestamps representing a plurality of anomalies detected by the anomaly detection model and a plurality of probabilities corresponding to the plurality of timestamps, wherein each probability indicates a probability of an anomaly at the corresponding timestamp, and wherein the anomaly detection model is a machine learning model trained to detect anomalies within time series datasets that comprise the unique combinations of the user identifier, the location identifier, and the action identifier;

in response to receiving the plurality of anomalies from the anomaly detection model, compare each anomaly received from the anomaly detection model with an anomaly confidence threshold, wherein the anomaly confidence threshold indicates a threshold probability that a detected anomaly not a false positive;

remove, from the plurality of anomalies, one or more timestamps corresponding to those anomalies that do not meet the anomaly confidence threshold to generate an updated plurality of anomalies;

generate one or more alerts based on the updated plurality of anomalies; and transmit the one or more alerts to an alert processing system.

2. The system of claim 1, wherein the instructions that cause the one or more processors to generate the plurality of entries further cause the one or more processors to:

access a first system event of the plurality of system events, wherein the first system event has an earliest timestamp as compared with other system events in the plurality of system events; and extract, from the first system event of the plurality of system events, a first timestamp, a first user identifier, a first location identifier, and a first action identifier; and store, in memory, a first entry comprising the first timestamp, the first user identifier, the first location identifier, and the first action identifier.

3. The system of claim 1, wherein the instructions that cause the one or more processors to transform the subset of the plurality of entries into the time series dataset, further cause the one or more processors to:

select, a first entry of the plurality of entries, wherein the first entry is associated with a first timestamp that is an earliest timestamp in the time series dataset;

iterate, chronologically, through the plurality of entries until a second entry with a second timestamp, wherein the second timestamp is a last timestamp within a time slot associated with the first timestamp;

identify one or more sets of entries having a unique combination of the user identifier, the location identifier, and the action identifier;

determine one or more counts of entries within the one or more sets of entries; and store the one or more counts of entries in association with the time slot.

4. A method comprising:

accessing a plurality of system events generated by one or more computing devices;

generating, for the plurality of system events, a plurality of entries, wherein each entry of the plurality of entries includes a corresponding timestamp indicating when each system event occurred, and a corresponding plurality of parameters comprising a corresponding user identifier indicating a user account within a computing environment associated with a corresponding system event, a corresponding location identifier indicating a location within the computing environment, and a corresponding action identifier indicating an action that the user account performed with respect to the location within the computing environment;

determining a plurality of equal time intervals of a time period associated with the plurality of entries;

for each time interval of the plurality of equal time intervals, transforming entries of the plurality of entries corresponding to a given time period into a time series dataset, based on unique combinations of the corresponding plurality of parameters comprising the corresponding user identifier, the corresponding location identifier, and the corresponding action identifier, wherein the time series dataset comprises an aggregated value for each unique combination of the corresponding plurality of parameters;

inputting the time series dataset into an anomaly detection model;

receiving, based on inputting the time series dataset comprising each corresponding aggregated value into the anomaly detection model, a plurality of timestamps representing a plurality of anomalies detected by the anomaly detection model and a plurality of probabilities corresponding to the plurality of timestamps, wherein each probability indicates a probability of an anomaly at the corresponding timestamp, and wherein the anomaly detection model is a machine learning model trained to detect anomalies within time series datasets that comprise the unique combinations of the corresponding plurality of parameters;

in response to receiving the plurality of anomalies from the anomaly detection model, comparing each anomaly received from the anomaly detection model with an anomaly confidence threshold, wherein the anomaly confidence threshold indicates a threshold probability that a detected anomaly is not a false positive;

removing, from the plurality of anomalies, one or more timestamps corresponding to those anomalies that do not meet the anomaly confidence threshold to generate an updated plurality of anomalies;

generating one or more alerts based on the updated plurality of anomalies; and transmitting the one or more alerts to an alert processing system.

5. The method of claim 4, further comprising:

receiving, from a computing device, an anomaly detection request, the anomaly detection request comprising anomaly detection criteria; and determining the corresponding plurality of parameters based on the anomaly detection criteria.

6. The method of claim 5, wherein transmitting the one or more alerts to the alert processing system comprises transmitting the one or more alerts to the computing device from which the anomaly detection request was received.

7. The method of claim 5, wherein determining the corresponding plurality of parameters based on the anomaly detection criteria comprises:

extracting, from a plurality of fields of the anomaly detection criteria, a plurality of values;

comparing each of the plurality of values with the plurality of fields within the plurality of entries;

determining, based on the comparing, that the plurality of values matches a subset of the plurality of fields; and assigning the subset of the plurality of fields as the corresponding plurality of parameters.

8. The method of claim 4, wherein generating the plurality of entries comprises: accessing a first system event of the plurality of system events, wherein the first system event has an earliest timestamp as compared with other system events in the plurality of system events;

extracting, from the first system event of the plurality of system events, a first timestamp and a first plurality of parameters; and storing, in memory, a first entry comprising the first timestamp, and the first plurality of parameters.

9. The method of claim 4, wherein transforming the plurality of entries into the time series dataset comprises:

selecting, a first entry of the plurality of entries, wherein the first entry is associated with a first timestamp that is an earliest timestamp in the time series dataset;
iterating, chronologically, through the plurality of entries until a second entry with a second timestamp, wherein the second timestamp is a last timestamp within a time slot associated with the first timestamp;
identifying one or more sets of entries having a unique combination of the corresponding plurality of parameters; and
determining one or more counts of entries within the one or more sets of entries; and storing the one or more counts of entries in association with the time slot.

10. The method of claim 9, wherein storing the one or more counts of the entries in association with the time slot comprises storing for the time slot a corresponding entry for each unique combination of the corresponding plurality of parameters, wherein each entry comprises a first field for storing the corresponding timestamp, a second field for storing a corresponding count, and a plurality of fields for storing each parameter of a given combination of the corresponding plurality of parameters.

11. A non-transitory, computer-readable medium for detecting anomalous access to system resources, storing instructions that, when executed by one or more processors, cause the one or more processors to perform operations comprising:
accessing a plurality of system events generated by one or more computing devices;
generating, for the plurality of system events, a plurality of entries, wherein each entry of the plurality of entries includes a corresponding timestamp indicating when each system event occurred, and a corresponding plurality of parameters comprising a corresponding user identifier indicating a user account within a computing environment associated with a corresponding system event, a corresponding location identifier indicating a location within the computing environment, and a corresponding action identifier indicating an action that the user account performed with respect to the location within the computing environment;
determining a plurality of equal time intervals of a time period associated with the plurality of entries;
for each time interval of the plurality of equal time intervals, transforming entries of the plurality of entries using a time interval and based on one or more parameters, the plurality of entries corresponding to a given time period into a time series dataset, based on unique combinations of the corresponding plurality of parameters comprising the corresponding user identifier, the corresponding location identifier, and the corresponding action identifier, wherein the time series dataset comprises an aggregated value for each unique combination of parameters;
inputting the time series dataset into an anomaly detection model;
receiving, based on inputting the time series dataset comprising each corresponding aggregated value into the anomaly detection model, a plurality of timestamps representing a plurality of anomalies detected by the anomaly detection model and a plurality of probabilities corresponding to the plurality of timestamps, wherein each probability indicates a probability of an anomaly at the corresponding timestamp, and wherein the anomaly detection model is a machine learning model trained to detect anomalies within time series datasets that comprise the unique combinations of the corresponding plurality of parameters;
in response to receiving the plurality of anomalies from the anomaly detection model, comparing each anomaly received from the anomaly detection model with an anomaly confidence threshold, wherein the anomaly confidence threshold indicates a threshold probability that a detected anomaly is not a false positive;
removing, from the plurality of anomalies, one or more timestamps corresponding to those anomalies that do not meet the anomaly confidence threshold to generate an updated plurality of anomalies;
generating one or more alerts based on the updated plurality of anomalies; and
transmitting the one or more alerts to an alert processing system.

12. The non-transitory, computer-readable medium of claim 11, wherein the instructions further cause the one or more processors to perform operations comprising:
receiving, from a computing device, an anomaly detection request, the anomaly detection request comprising anomaly detection criteria; and
determining the corresponding plurality of parameters based on the anomaly detection criteria.

13. The non-transitory, computer-readable medium of claim 12, wherein the instructions for transmitting the one or more alerts to the alert processing system further cause the one or more processors to transmit the one or more alerts to the computing device from which the anomaly detection request was received.

14. The non-transitory, computer-readable medium of claim 12, wherein the instructions for determining the corresponding plurality of parameters based on the anomaly detection criteria further cause the one or more processors to:
extract, from a plurality of fields of the anomaly detection criteria, a plurality of values;
compare each of the plurality of values with the plurality of fields within the plurality of entries;
determine, based on the comparing, that the plurality of values matches a subset of the plurality of fields; and
assign the subset of the plurality of fields as the corresponding plurality of parameters.

15. The non-transitory, computer-readable medium of claim 11, wherein the instructions that cause the one or more processors to generate the plurality of entries further cause the one or more processors to perform operations comprising:
accessing a first system event of the plurality of system events, wherein the first system event has an earliest timestamp as compared with other system events in the plurality of system events;
extracting, from the first system event of the plurality of system events, a first timestamp and a first plurality of parameters; and
storing, in memory, a first entry comprising the first timestamp, and the first plurality of parameters.

16. The non-transitory, computer-readable medium of claim 12, wherein the instructions that cause the one or more processors to aggregate the plurality of entries into the time series dataset further cause the one or more processors to perform operations comprising:
selecting, a first entry of the plurality of entries, wherein the first entry is associated with a first timestamp that is an earliest timestamp in the time series dataset;
iterating, chronologically, through the plurality of entries until a second entry with a second timestamp, wherein the second timestamp is a last timestamp within a time slot associated with the first timestamp;

identifying one or more sets of entries having a unique combination of the corresponding plurality of parameters;

determining one or more counts of entries within the one or more sets of entries; and storing the one or more counts of entries in association with a time slot.

17. The non-transitory, computer-readable medium of claim 16, wherein storing the one or more counts of entries in association with the time slot comprises storing for the time slot a corresponding entry for each unique combination of the parameters, wherein each entry comprises a first field for storing the corresponding timestamp, a second field for storing a corresponding count, and a plurality of fields for storing each parameter of a given combination of the parameters.

* * * * *